US009472005B1

(12) United States Patent
Marason et al.

(10) Patent No.: US 9,472,005 B1
(45) Date of Patent: Oct. 18, 2016

(54) PROJECTION AND CAMERA SYSTEM FOR AUGMENTED REALITY ENVIRONMENT

(75) Inventors: Eric G. Marason, San Francisco, CA (US); William Thomas Weatherford, San Mateo, CA (US); Christopher D. Coley, Morgan Hill, CA (US); Robert A. Yuan, Belmont, CA (US); Miguel Virgen, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 13/527,503

(22) Filed: Jun. 19, 2012

Related U.S. Application Data

(60) Provisional application No. 61/635,211, filed on Apr. 18, 2012, provisional application No. 61/646,165, filed on May 11, 2012.

(51) Int. Cl.
*G06T 11/60* (2006.01)

(52) U.S. Cl.
CPC ...................... *G06T 11/60* (2013.01)

(58) Field of Classification Search
CPC ............................ G06T 19/006; G09F 19/18
USPC ............................................ 345/633; 353/28
See application file for complete search history.

(56) References Cited

U.S. PATENT DOCUMENTS

| 5,905,540 | A | 5/1999 | Miyashita et al. |
| 5,999,335 | A | 12/1999 | Koyama et al. |
| 6,135,600 | A | 10/2000 | Fujimori |
| 6,563,105 | B2 * | 5/2003 | Seibel et al. ............... 250/208.1 |
| 7,355,648 | B1 * | 4/2008 | Braun et al. ................... 348/370 |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2002/0191153 | A1 * | 12/2002 | Wei et al. ...................... 351/243 |
| 2003/0002016 | A1 * | 1/2003 | Sellen et al. .................... 353/31 |
| 2004/0037450 | A1 * | 2/2004 | Bradski .......................... 382/103 |
| 2008/0151129 | A1 | 6/2008 | Abe |
| 2009/0219253 | A1 * | 9/2009 | Izadi et al. ..................... 345/173 |
| 2009/0262098 | A1 * | 10/2009 | Yamada ........................ 345/175 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — James A Thompson
(74) *Attorney, Agent, or Firm* — Lee & Hayes, PLLC

(57) ABSTRACT

A device includes a projection and camera system to create an augmented reality environment in which images are projected onto a scene and user movement within the scene is captured. The projection and camera system have a camera to image scattered IR light from the scene and compute time of flight values used in depth mapping of objects in the room. The system also has a projector to project the images onto the scene. The projected images and scattered IR light use a common optical path through the same lens. Additionally, an illumination system used to illuminate the scene with the IR light may also use the common optical path through the same lens. In one implementation, the projection and camera system are mounted in a movable head of a table lamp.

31 Claims, 15 Drawing Sheets

(56) References Cited

U.S. PATENT DOCUMENTS

| | | |
|---|---|---|
| 2011/0037849 A1* | 2/2011 | Niclass et al. ............... 348/135 |
| 2011/0178764 A1* | 7/2011 | York ............................ 702/152 |
| 2011/0178765 A1* | 7/2011 | Atwell et al. ................ 702/152 |
| 2011/0288964 A1 | 11/2011 | Linder et al. |
| 2011/0304842 A1* | 12/2011 | Kao et al. ................... 356/5.01 |
| 2011/0317005 A1* | 12/2011 | Atkinson ..................... 348/135 |
| 2012/0075534 A1* | 3/2012 | Katz et al. ................... 348/602 |
| 2012/0223885 A1 | 9/2012 | Perez |
| 2012/0262553 A1* | 10/2012 | Chen et al. ................... 348/47 |
| 2012/0287247 A1* | 11/2012 | Stenger et al. ................ 348/47 |
| 2013/0021491 A1* | 1/2013 | Lee et al. .................. 348/222.1 |
| 2013/0107000 A1* | 5/2013 | Xue et al. ...................... 348/46 |
| 2013/0114861 A1* | 5/2013 | Takizawa ..................... 382/106 |
| 2013/0141419 A1* | 6/2013 | Mount et al. ................ 345/419 |
| 2013/0196772 A1* | 8/2013 | Latta et al. .................... 463/42 |
| 2013/0226344 A1* | 8/2013 | Wong et al. ................. 700/258 |
| 2013/0237811 A1* | 9/2013 | Mihailescu et al. ......... 600/424 |
| 2014/0120319 A1* | 5/2014 | Joseph ......................... 428/172 |

OTHER PUBLICATIONS

Office Action for U.S. Appl. No. 13/527,519, mailed on Mar. 26, 2015, Eric G. Marason, "Projection and Camera System for Augmented Reality Environment", 19 pages.

Office action for U.S. Appl. No. 13/527,519, mailed on Feb. 16, 2016, Marason et al., "Projection and Camera System for Augmented Reality Environment", 19 pages.

Office action for U.S. Appl. No. 13/527,519, mailed on Sep. 24, 2015, Marason et al., "Projection and Camera System for Augmented Reality Environment", 20 pages.

* cited by examiner

PROJECTION AND CAMERA SYSTEM FOR AUGMENTED REALITY ENVIRONMENT

CROSS REFERENCE TO RELATED PATENT APPLICATIONS

This application claims priority to U.S. Provisional Patent Application No. 61/635,211, filed on Apr. 18, 2012, entitled "Projection and Camera System for Augmented Reality Environment," and to U.S. Provisional Patent Application No. 61/646,165, filed on May 11, 2012, also entitled "Projection and Camera System for Augmented Reality Environment." Both of these provisional applications are hereby incorporated by reference in their entirety.

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 13 shows a projected light path through the three-prism arrangement of FIG. 12, when the digital light processing (DLP) chip has pixels turned on.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented as a table lamp. However, the various implementations of the architecture described herein are merely representative.

Illustrative Environment

Figure 1:
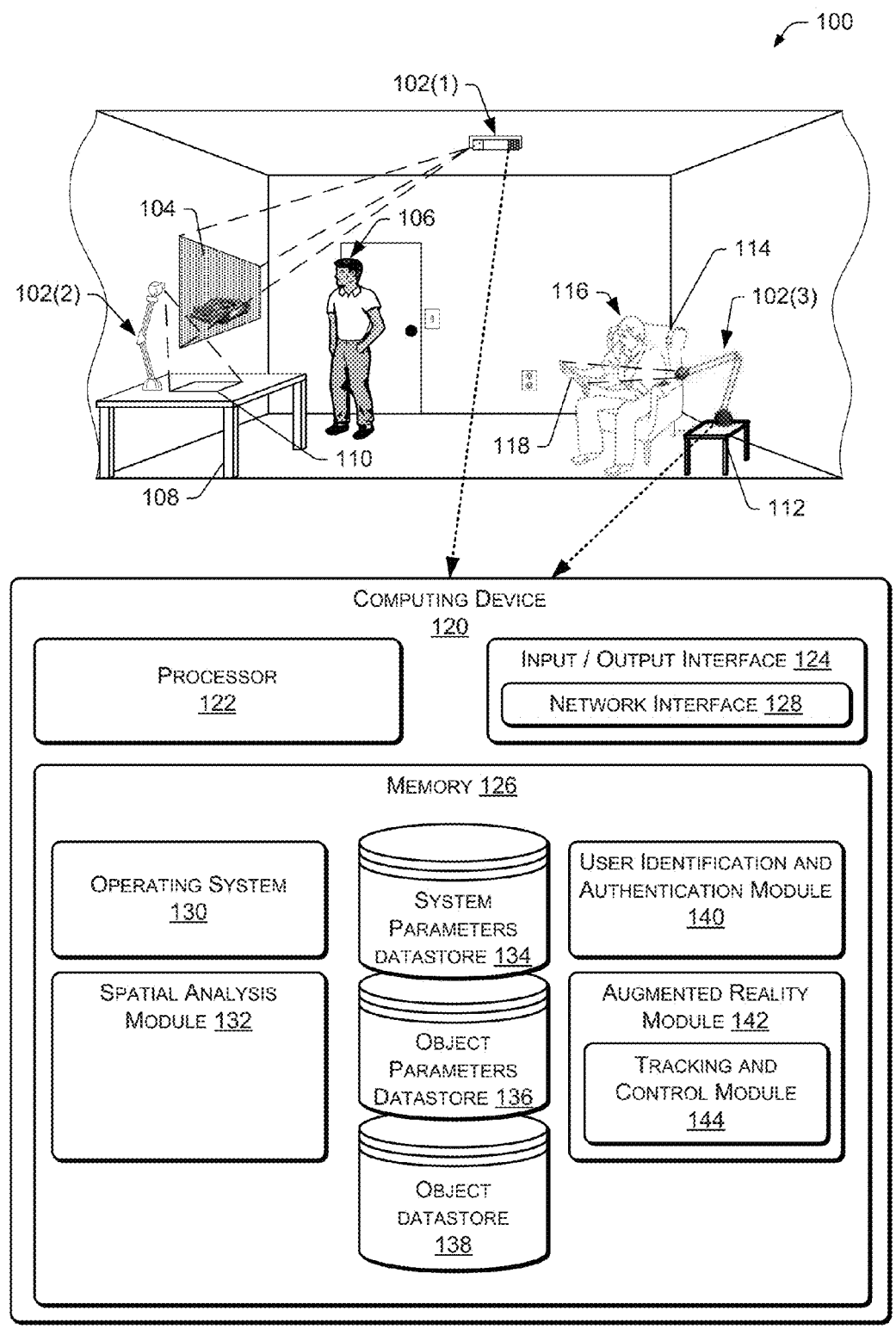
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

First ARFN Implementation—Separate Optics Paths

Figure 2:
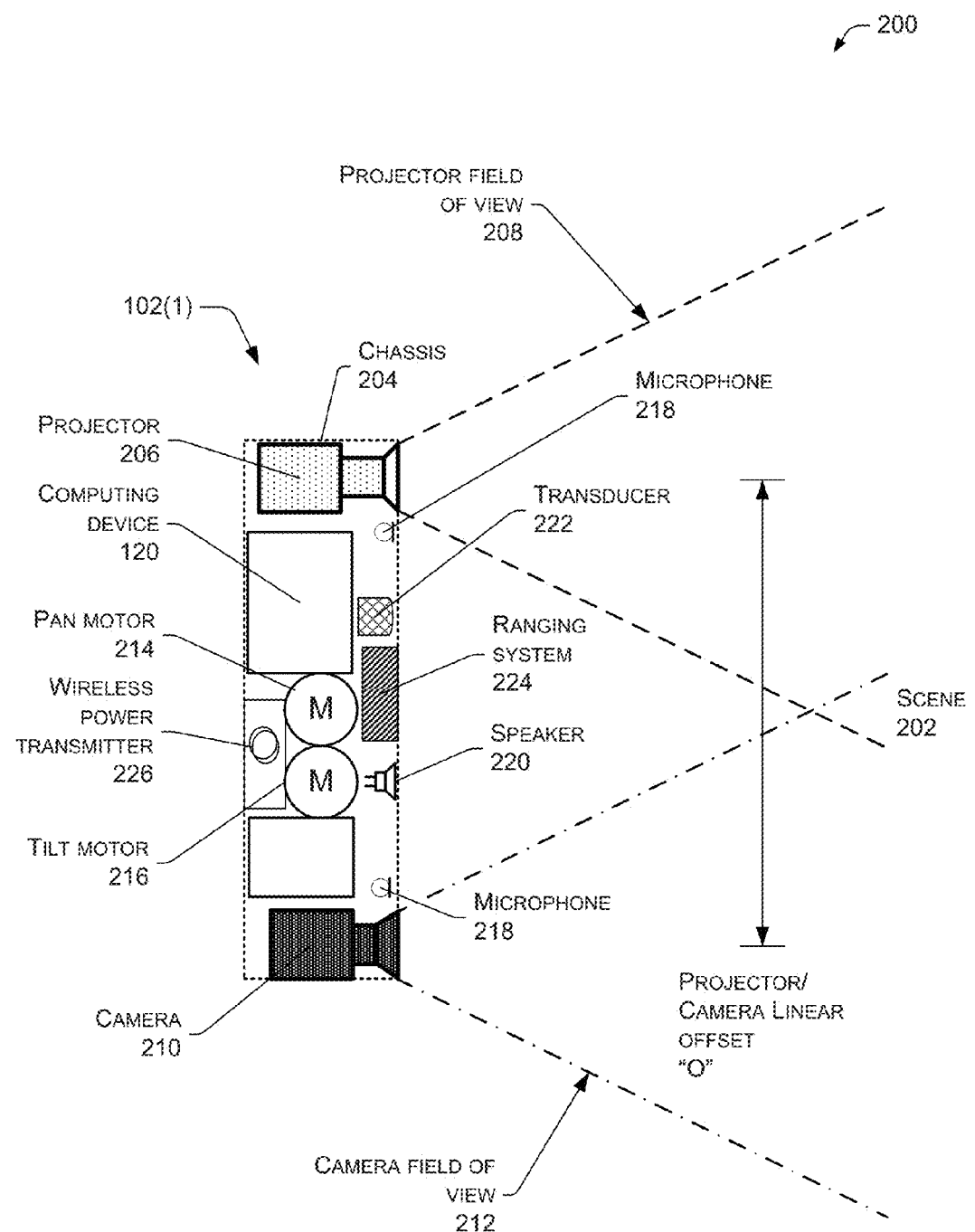
FIG. 2 shows a first implementation of a projection and image capturing system formed as an augmented reality functional node having a chassis to hold a projector and camera in spaced relation to one another. In this implementation, the projector and camera have different optic paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
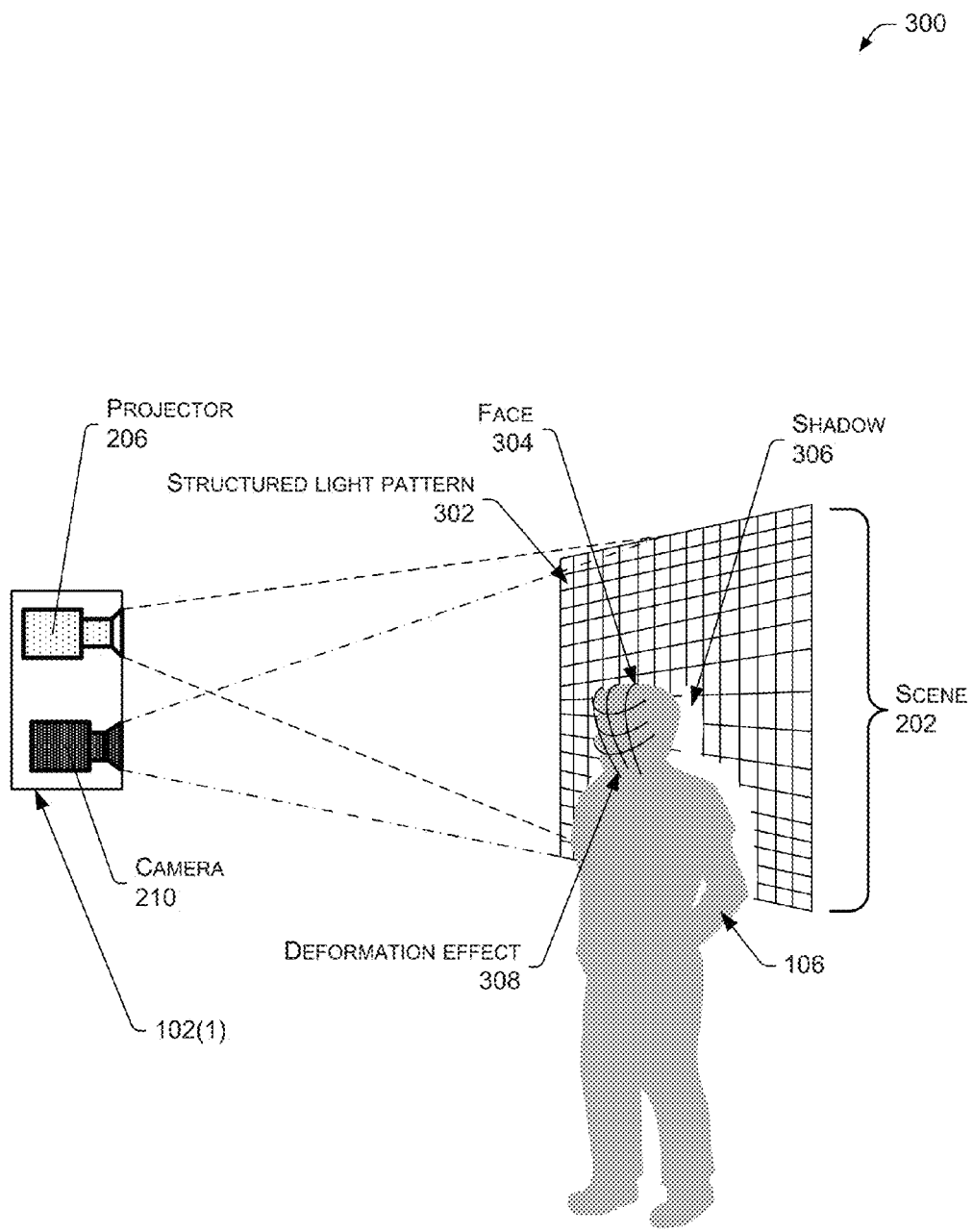
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Second ARFN Implementation—Common Optical Path

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

Figure 4:
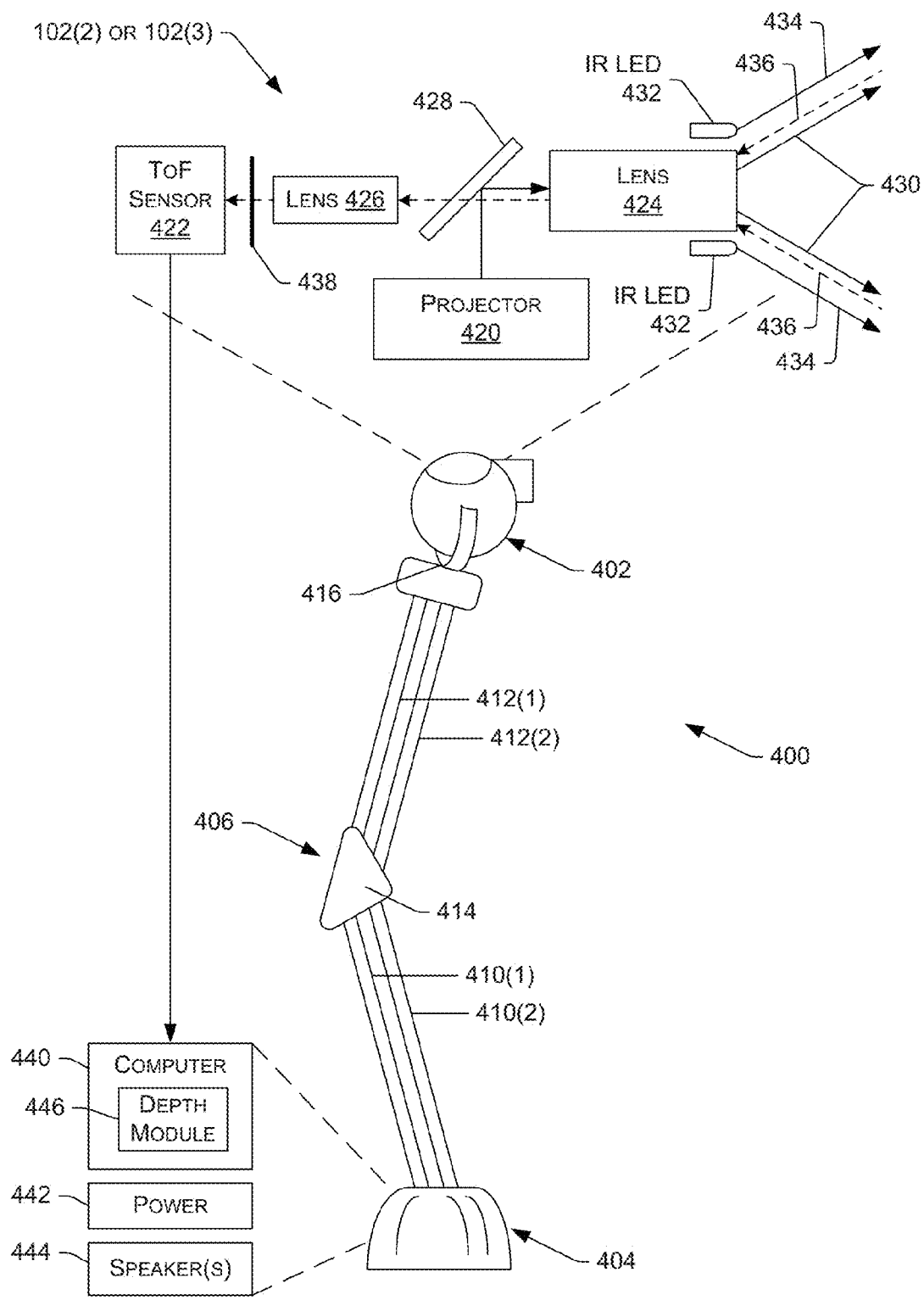
FIG. 4 shows a second implementation of a projection and image capturing system formed as a familiar type of furniture, such as a table lamp. In this implementation, the projector and camera share a common optical path through a common lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 326. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102(1).

It is noted that, in other implementations, the projector 420 may be arranged to project an image that is passed through the beam splitter 428 and out through the lens 424, rather than being reflected by the beam splitter 428. In this arrangement, the returning IR signals maybe received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442 and one or more speakers 444. The computer may include processing and memory to execute instructions. A depth module 446 may be executed by the computer 440 to measure a time of flight for an IR signal (or other modulated light output). The time-of-flight value may be derived as a function of a time lapsed between emission from an IR LED 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Figure 5:
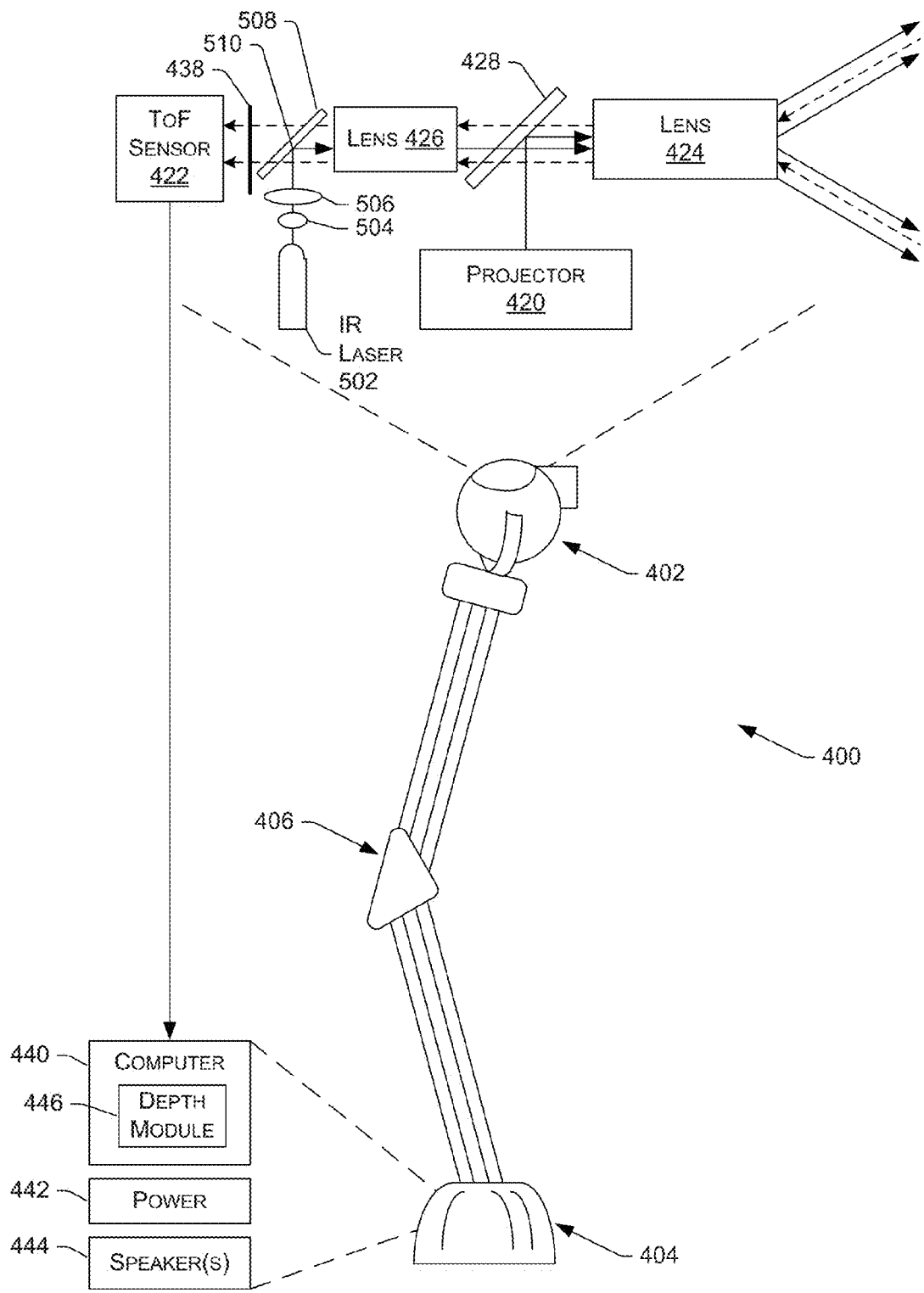
FIG. 5 shows a third implementation of a projection and image capturing system, which is formed as a table lamp similar to the embodiment of FIG. 4. In this implementation, the projector and camera share a common optical path through a common lens, and illumination components also share the same optical path.

FIG. 5 shows another implementation of the ARFN 102(2) or 102(3), also shown implemented as part of a table lamp 400. This implementation differs from that of FIG. 4 in that the illumination system also shares the same optical path as the projector 420 and the ToF sensor 422.

In FIG. 5, an IR laser 502 is used in place of the IR LEDs 432 of FIG. 4. The IR laser 502 outputs an IR beam that is expanded by a beam expander 504 and then concentrated by a focus lens 506 onto an angled beam splitter 508. In one implementation, the angled beam splitter 508 is formed of a material that passes light (e.g., glass) and has a reflective patch 510 at its center. The focus lens 506 concentrates the IR beam onto the reflective patch 510 of the beam splitter 508, which directs the beam through lens 426, through the beam splitter 428, and out through the lens 424. The reflective patch covers the center portion of the beam splitter 508 and may have any number of shapes, such as circular, oval, polygonal, and so forth. With this arrangement, the size and area of interest can be controllably illuminated by use of the lens 424 and modulated IR laser light. The illuminated area is roughly the same size, or slightly larger, than the area onto which images are projected, as is shown in more detail with reference to FIG. 6.

IR signals scattered from a populated landscape are then collected by the head 402 and passed back through the lens 424, through the beam splitter 428, through lens 426, through the non-reflective portion of the angled reflector 508, through the filter 438, and to the ToF sensor 422. Accordingly, the collected scattered IR light forms an image on the ToF sensor 422 that is used to compute time of flight values for depth analysis of the landscape of the scene.

One of the advantages of placing the IR laser 502 as shown and passing the IR beam through the lens system is that the power used for illumination may be reduced as compared to the implementation of FIG. 4, where the IR LEDs are external to the optical path. Illumination typically degrades inversely proportional to the square of the distance. In FIG. 4, the forward and return paths result in an illumination inversely proportional to the distance to the power of four. Conversely, illumination through the same lens means that the returned light is inversely proportional to square of the distance, and therefore can use less stronger illumination to achieve the same results.

It is further noted that essentially any IR device may be used in these systems. Although IR LEDs and IR lasers are shown in the implementations of FIGS. 4 and 5, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 6:
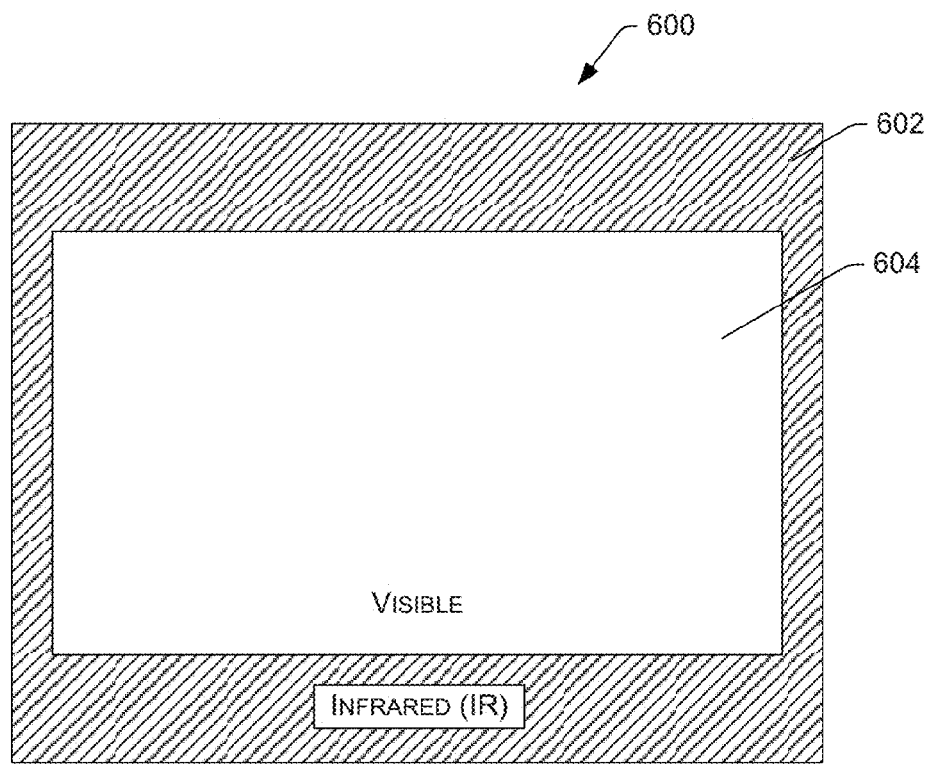
FIG. 6 shows a first area of illumination and a second area of image capture that may be realized by the implementations of FIGS. 4 and 5.

FIG. 6 shows a coverage pattern 600 provided by the ARFN 102(2) or 102(3). The coverage pattern 600 has an illumination area 602 covered by the IR-based illumination system. The coverage pattern 600 also has a projection area 604 covered by the projected image. As shown in this footprint, the illumination area 602 is larger than, and encompasses, the projection area 604. However, in other implementations, the illumination area 602 may be equal to or smaller than, and be encompassed by, the projection area 604. The second lens 426 in the device allows for adjustment in the relative coverage to enable overscan or underscan conditions.

Figure 7:
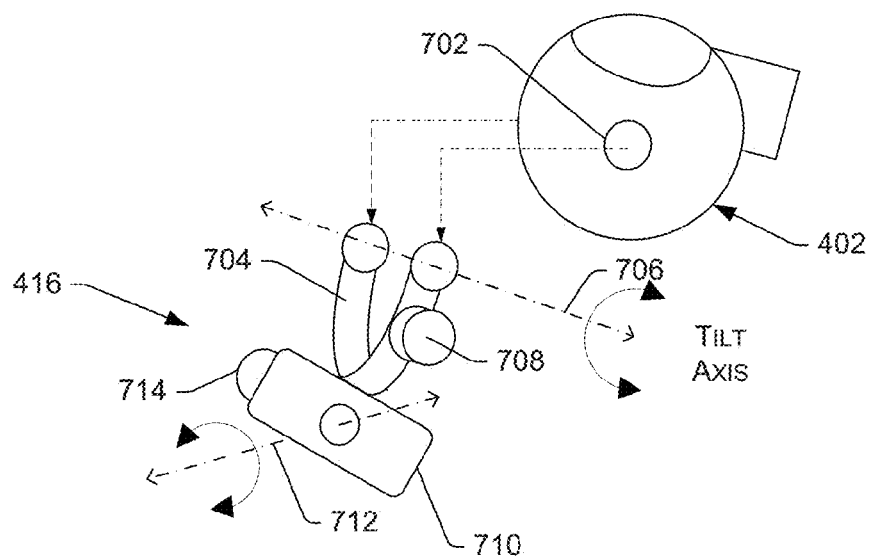
FIG. 7 shows an exploded view of a head and universal mount of the lamp implementation shown in FIGS. 4 and 5.

FIG. 7 shows an exploded view 700 of the head 402 and the universal mount 416 of the lamp implementation shown in FIGS. 4 and 5. Here, the head 402 is generally spherical, although it may be made of any shape, size or form factor. The head 402 has two mounting members 702 on opposing sides of the sphere. The mounting members 702 may be pivotally mounted within a U-shaped cradle 704 to facilitate rotation about a tilt axis 706. A tilt motor 708 may be included to move the head 402 about the tilt axis 706.

The U-shaped cradle 704 is movably mounted relative to structural bracket 710. The U-shaped cradle 704 may be pivoted about a pan axis 712. A pan motor 714 may be included to pivot the U-shaped cradle 704 and head 402 about the pan axis 712.

Figure 8:
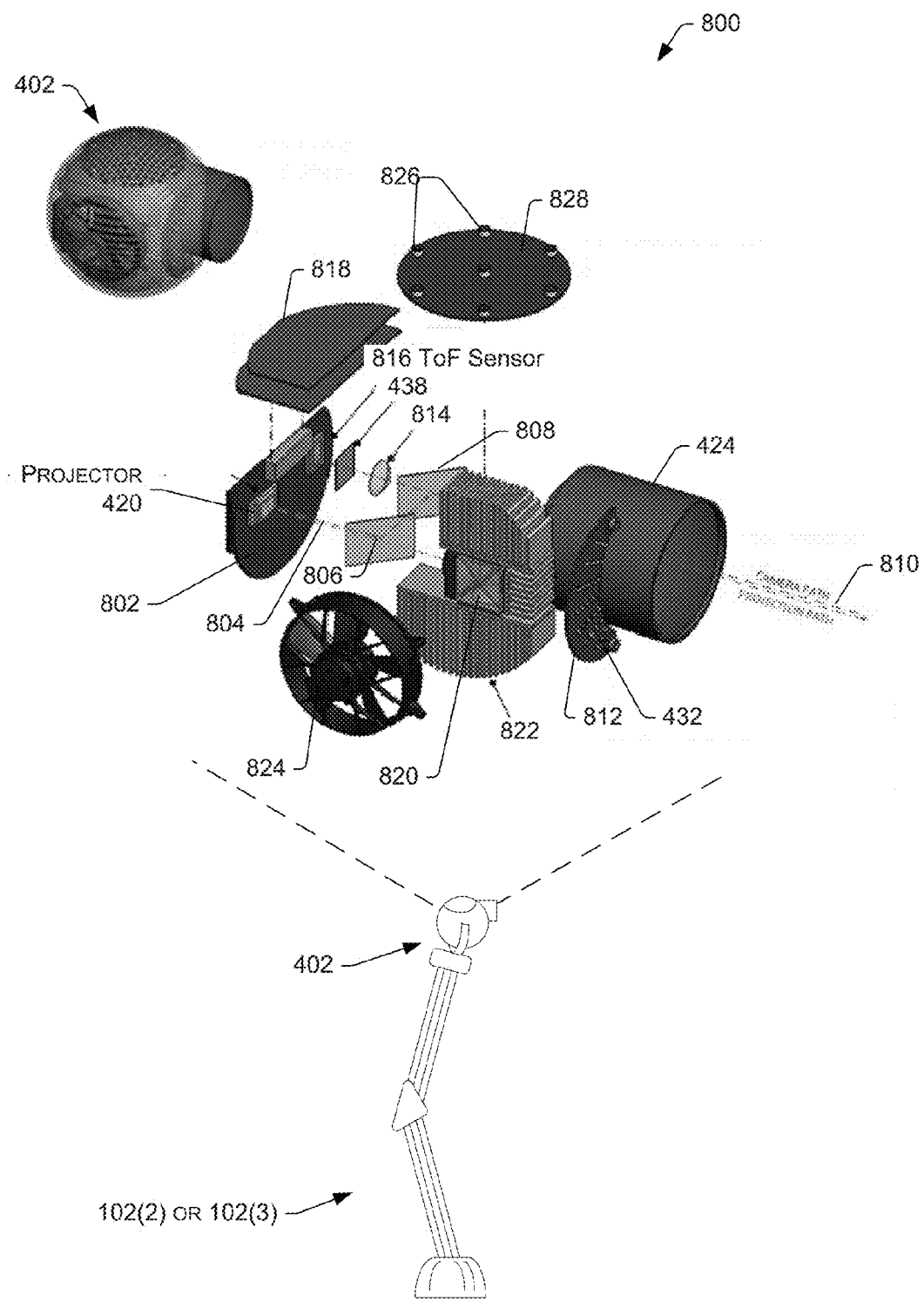
FIG. 8 shows an exploded view of components in the lamp head according to one implementation.

FIG. 8 shows an exploded view 800 of components in the head 402 of the lamp-embodied ARFN 102(2) or 102(3) according to one implementation. The head 402 includes the projector 420, implemented here as a projector imaging chip mounted on a printed circuit board (PCB) 802. The projector 420 outputs a light beam 804 that is reflected by a first angled reflector 806 and reflected again by a beam splitter 808. From the beam splitter 808, the projected light 804 is on a common optical path 810 through the lens 424.

A front PCB 812 carries an array of IR LEDs 432 for illuminating the scene. The IR LEDs 432 emit IR beams that go into the environment, bounce off objects, and return to the lens 424. The returning IR signals are passed through the beam splitter 808, through a sensor lens 814 and IR filter 438, and onto the ToF IR sensor 816. The front PCB 812 may further mount two RGB cameras: one with a wide field of view and one with a narrow field of view. A rear PCB 818 carries the electronics for the projector 420 and ToF IR sensor 816.

A light source 820 illuminates the projector imaging chip. The light source 820 may be an LED, laser, filament-based lamp, and so forth. A heat sink 822 is shown formed around the light source 820 to help dissipate heat. A cooling fan 824 may also be included in the head 420.

An array of microphones 826 is mounted on a PCB 828 to capture sound from the environment. This particular array has 7 microphones, with one microphone at the center of a circle of six microphones.

Figure 9:
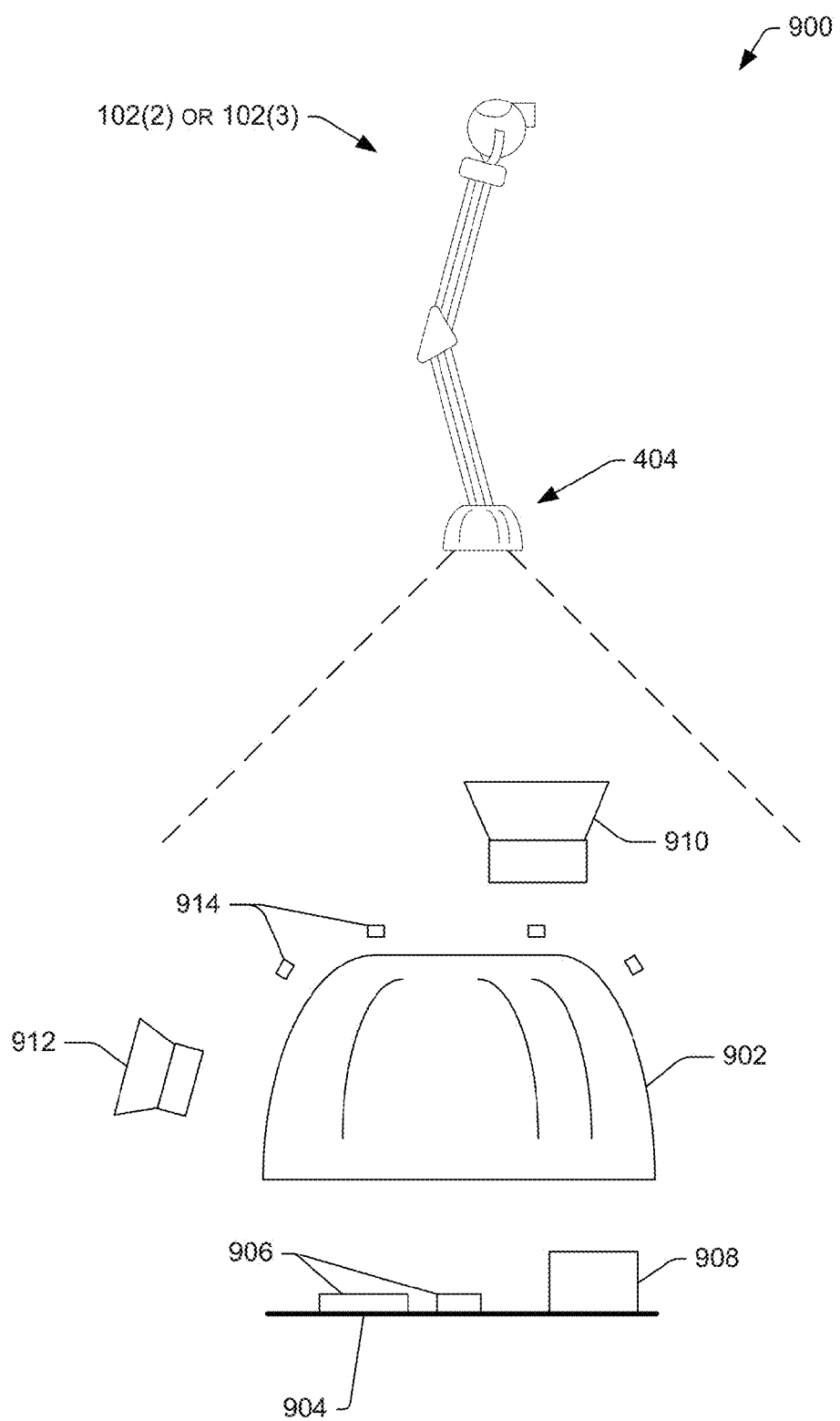
FIG. 9 shows an exploded view of components in a base of the lamp according to one implementation.

FIG. 9 shows an exploded view 900 of components in the base 404 of the lamp-embodied ARFN 102(2) or 102(3) according to one implementation. The base 404 includes a housing 902 formed of a material suitable to encase the active components and to provide sufficient weight to hold the lamp on a surface while the head and arm mechanism are moved and fully extended in various directions. A PCB 904 is mounted in the bottom of the housing 902 and defines the main logic board of the ARFN 102. The PCB 904 holds various computing components 906 of computer 440, such as processor(s), memory, and I/O interfaces. A power supply 908 is also provided on the PCB 904.

One or more speakers may be arranged within the housing 902. Two speakers 910 and 912 are illustrated in FIG. 9. The first speaker 910 is a low frequency speaker, while the second speaker 912 has a mid to high frequency range. One or more microphones 914 may also be arranged in the base housing 902.

Figure 10:
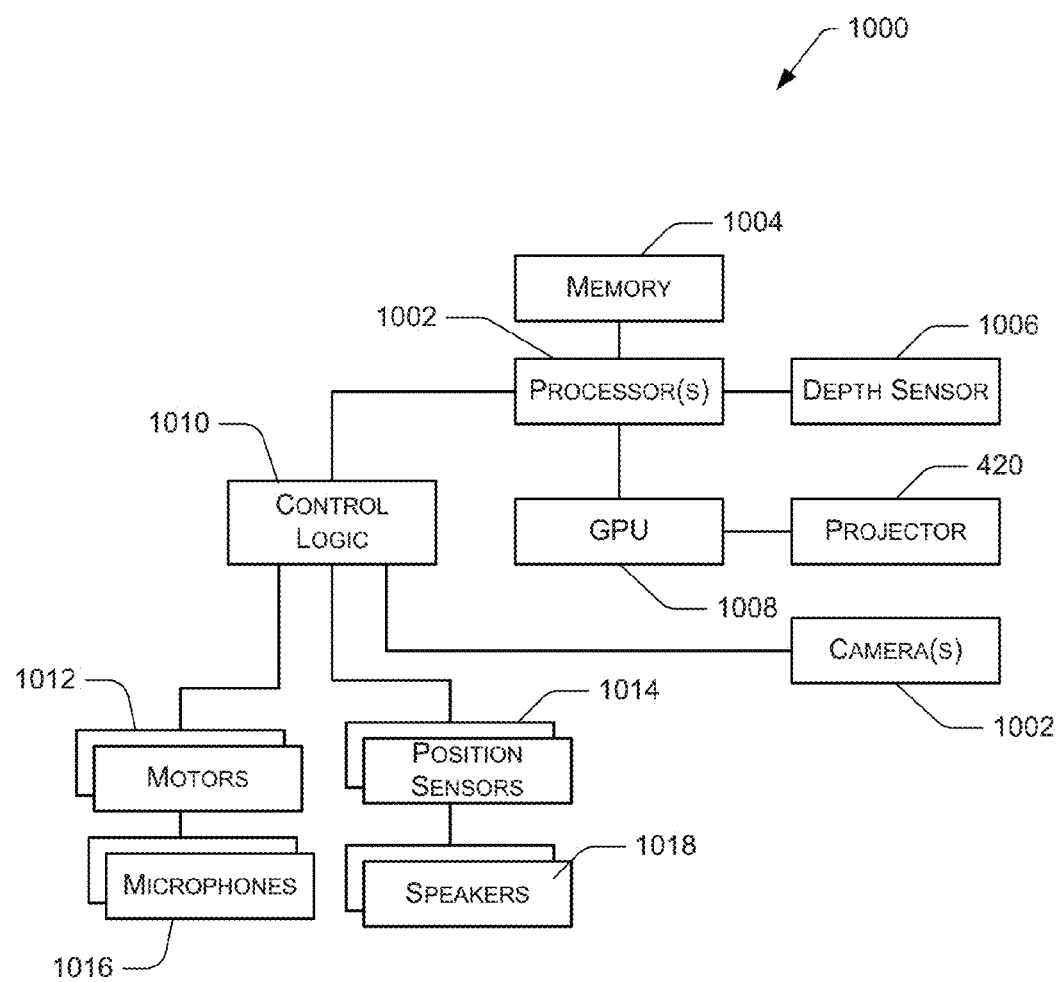
FIG. 10 is a block diagram of functional components that may be used in the implementations of FIGS. 4 and 5.

FIG. 10 shows functional components 1000 that may be implemented as part of the lamp-embodied ARFN 102(2) or 102(3) of FIGS. 4 and 5, respectively. The functional components 1000 include one or more processors 1002 coupled to memory 1004. A depth sensor 1006 may be coupled to the processor 1002, formed as part of the processor 1002, or implemented as firmware/software stored in the memory 1004 and executed on the processor 1002. A separate graphics processing unit (GPU) 1008 may be coupled to the processor 1002 to generate the images to be projected by the projector 420.

Control logic 1010, such as a field programmable gate array (FPGA), is shown coupled to the processor 1002 to control various electrical and mechanical components. For instance, the control logic 1010 may be coupled to control various motors 1012, such as the tilt motor 708 and the pan motor 714 of the universal connector 416 in FIG. 7. The control logic 1010 may also be coupled to control position sensors 1014, microphones 1016 (e.g., microphones 826 in FIG. 8), and speakers 1018 (e.g., speakers 910 and 912 in FIG. 9).

Illustrative Process

Figure 11:
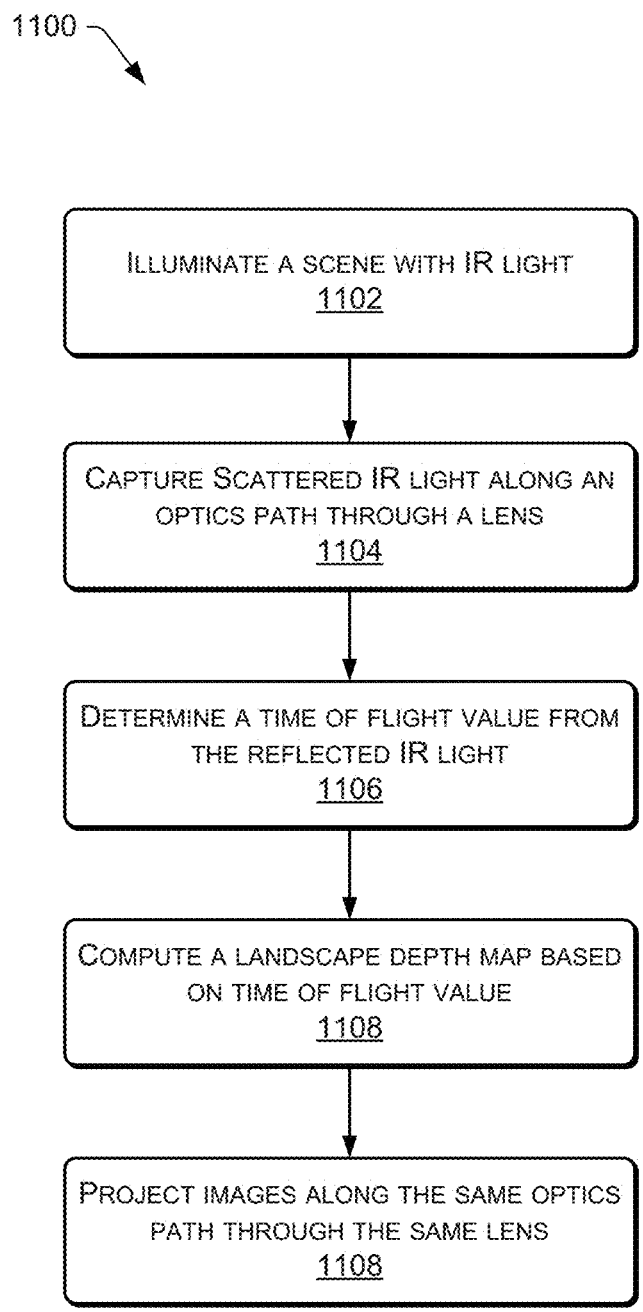
FIG. 11 shows an illustrative process of providing an enhanced augmented reality environment using a projection and camera system that shares a common optical path.

FIG. 11 shows an illustrative process 1100 of providing an enhanced augmented reality environment using a projection and camera system that shares a common optical path. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1102, a scene is illuminated with IR light. In one implementation, the IR light may be emitted from an array of LEDs or lasers positioned about a lens, as shown in the example of FIGS. 4 and 7. Alternatively, an IR beam from a laser may be passed through a lens of the ARFN, as shown in the example of FIG. 5.

At 1104, scattered IR light from objects in the scene is captured along an optical path through a lens. As shown in FIGS. 5 and 6, for example, the IR light is collected through the lens 424 along the optical path defined therein. The IR light is directed to a time-of-flight camera and/or sensor.

At 1106, a time of flight is determined from the scattered IR light. This computation may be made by a depth module 446 (or hardware) in the computer 440 based on a time-of-flight of the IR light from emission to capture by the ToF sensor 422.

At 1108, a landscape depth map is computed based on the time of flight computations. This depth map helps the system understand the dimensions and layout of the room for purposes of creating an augmented reality environment.

At 1110, images are projected along the same optical path and through the same lens as used to collect the IR light for ToF calculations. In the implements of FIGS. 4 and 5, the projector 420 outputs the light carrying the images, and that light is passed through the lens 424 along the same optical path as the IR light.

In this manner, the methodology enabled by the projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Exemplary Prism Arrangements

Figure 12:
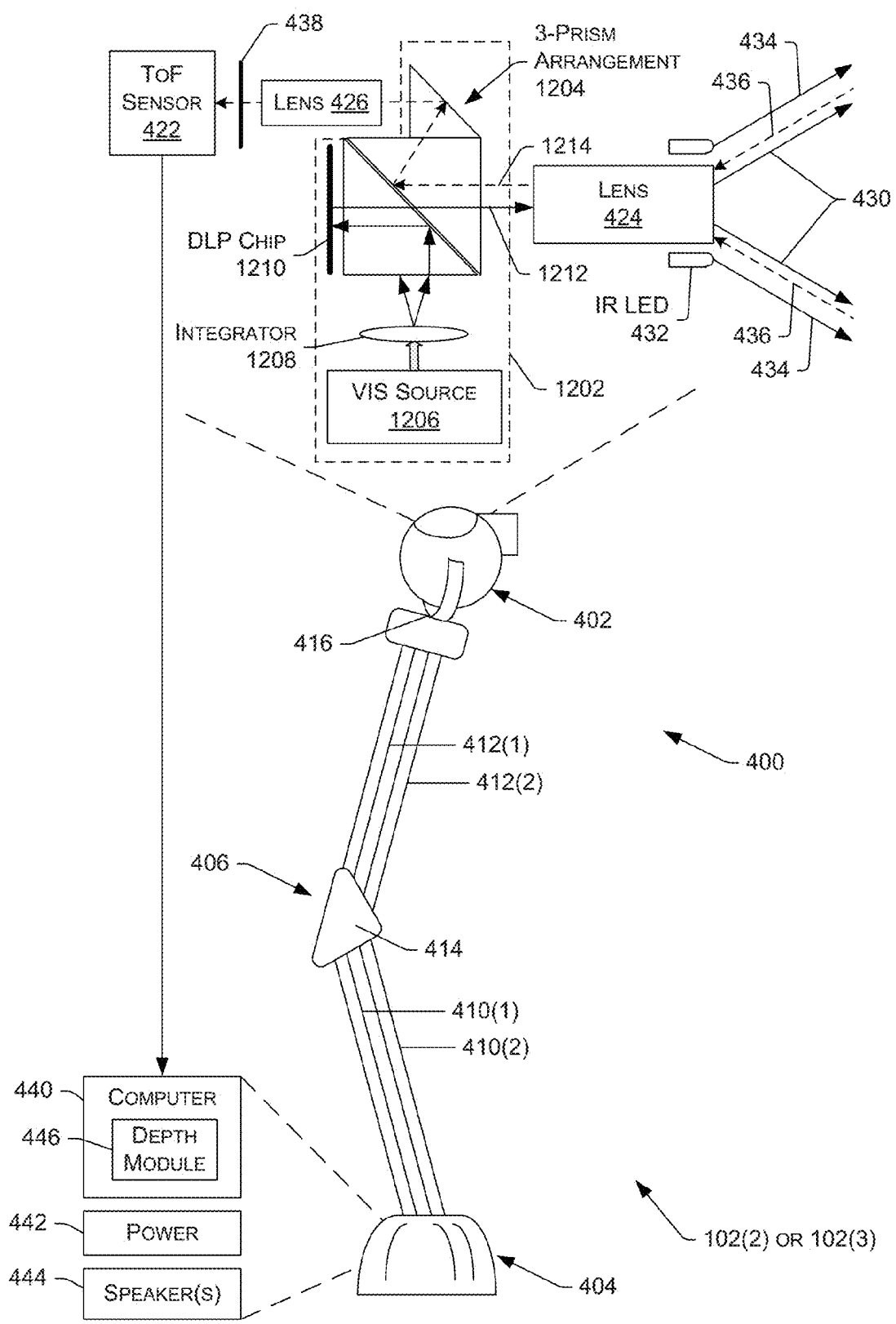
FIG. 12 shows a third implementation of a projection and image capturing system formed as a familiar type of furniture, such as a table lamp. In this implementation, a three-prism arrangement forms part of the common optical path.

FIG. 12 shows another implementation of the ARFN 102(2) or 102(3), also shown implemented as part of a table lamp 400. This implementation differs from that of FIG. 4 in that it employs a prism arrangement to form at least part of the common optical path.

In FIG. 12, the head 402 contains a projector 1202 and a prism arrangement 1204 which may be integrated as part of the projector 1202 (as shown), or separate. In this illustration, the prism arrangement 1204 has three prisms. The three-prism arrangement 1204 replaces the beam splitter 428 in the optical path, as shown in the implementations of FIGS. 4 and 5. The three-prism arrangement 1204 facilitates conveyance of visible light onto the scene and reception of an infrared image without use of the beam splitter 428. In this manner, the distance between the three-prism arrangement 1204 and the lens 424 is reduced, enabling use of smaller projection lenses as well as more sophisticated projection lenses with improved features (such as zoom ranges). Further, the size of the system may be reduced, allowing for smaller profiles, such as the lamp head 402.

It is noted that although three prisms are shown in the arrangement 1204, other multi-prism arrangements may be used direct projected visible light and captured IR light along a common optical path.

The projector 1202 includes a visible (VIS) light source 1206 generating visible light components (e.g., Red, Blue, Green components) that are passed through an integrator 1208 and into the three-prism arrangement 1204. The light source 1206 fast sequences the RGB components, and the integrator 1208 forms a more uniform rectangular beam. The integrator 1208 is typically two back-to-back rectangular arrays of short focal length rectangular plano-convex lenses ("fly's eye"). The aspect ratio of each tiny lens and that of the DMD are equal. Alternatively, integrator 1208 could be a long rectangular rod with mirrored sides that allows multiple internal reflections. Either implementation creates a uniform light field at the surface of the DMD with minimal waste of light.

The light is reflected within the three-prism arrangement 1204 onto a digital light processing (DLP) chip 1210 having an array of pixel-sized micromirrors, which is sometimes referred to as a Digital Micromirror Device (DMD). When the micromirrors forming the pixels of the DLP chip 1210 are switched to a first state, the light is reflected out through the three-prism arrangement 1204 to lens 424 for projection onto the scene. The solid line 1212 from the integrator 1208 through the three-prism arrangement 1204 represents the light path of the visible light emitted from source 1206. When the micromirrors forming the pixels of the DLP chip 1210 are switched to a second state, the visible light is reflected along a different path that exits the three-prism arrangement 1204 in a direction that avoids the lens 424.

Figure 13:
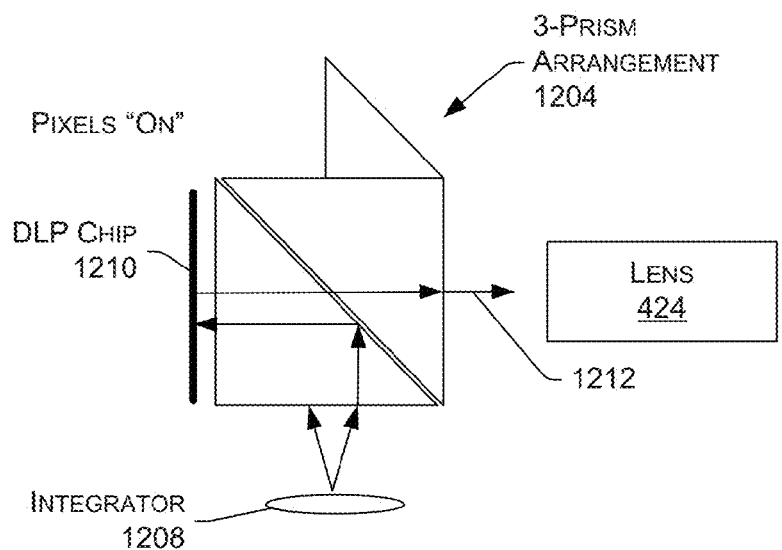
Figure 14:
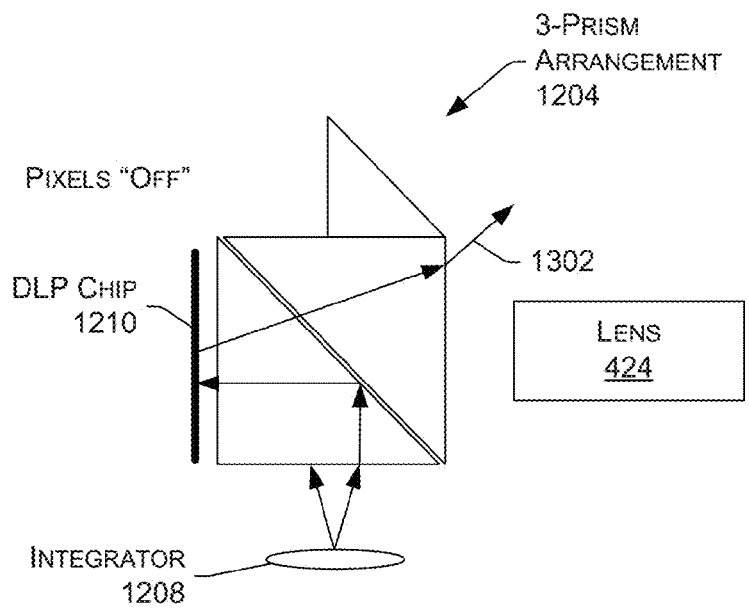
FIG. 14 shows a projected light path through the three-prism arrangement of FIG. 12, when the DLP chip has pixels turned off.

FIGS. 13 and 14 show the effect of the two states of DLP chip 1210 on the light path through the three-prism arrangement 1204 in more detail. FIG. 13 shows a projected light path through the three-prism arrangement 1204, when the digital light processing (DLP) chip 1212 has the micromirrors in the first state. In this case, as least some of the light is reflected out through the three-prism arrangement 1204 to the lens 424, as represented by path 1212. FIG. 14 shows a projected light path through the three-prism arrangement 1204, when the DLP chip has micromirrors in the second state. Notice that the light is reflected at an angle from the DLP chip 1210, and upon exiting the three-prism arrangement 1204, the light bypasses lens 424 and is absorbed internally of the lamp head.

With reference again to FIG. 12, IR light is emitted by the IR LEDs 432 and scattered light is captured by the lens 424 and returned to the three-prism arrangement 1204. The IR light is reflected through the three-prism arrangement 1204 and out through the lens 426, IR filter 438, and onto the time of flight sensor 422. The dashed line 1214 shows a representative path of the IR light.

Figure 15:
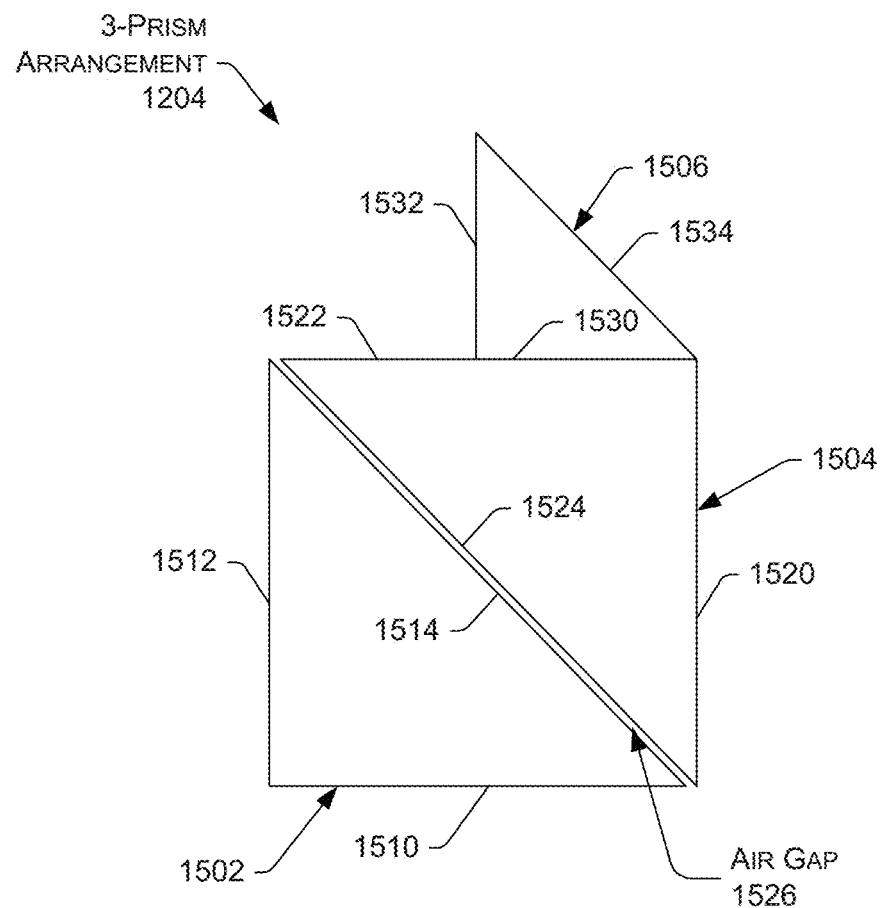
FIG. 15 shows an example implementation of the three-prism arrangement of FIG. 12.

FIG. 15 shows the three-prism arrangement 1204 in more detail. It contains a first or base end prism 1502, a second or middle prism 1504, and a third or top end prism 1506. The prisms 1502-1506 may be made of any type of light transmissive material, such as glass. Each of the three prisms 1502-1506 has a three-sided triangular cross-section (as shown), and each prism defines three planar surfaces that either reflect or pass light.

The first prism 1502 has a first side or surface 1510, a second side or surface 1512, and a third side or surface 1514. The first and second surfaces 1510 and 1512 may be approximately equal in width and length. These surfaces are coated with an anti-reflection coating. The third surface 1514 (defined by the longer side) may be implemented, for example, without any coating material.

The second prism 1504 has a first side or surface 1520, a second side or surface 1522, and a third side or surface 1524. In some implementations, the second prism 1504 may be approximately the same size and shape as the first prism 1502. The second prism 1504 is placed adjacent to, but slightly spaced from, the first prism 1502. The third surface 1524 of the second prism 1504 is juxtaposed with the third surface 1514 of the first prism 1502 across an air gap 1526. The air gap 1526 separating the first and second prisms 1502 and 1504 may be very small, on the order of a fraction of a millimeter (e.g., ½ millimeter, ¼ millimeter, etc.).

The first and second surfaces 1520 and 1522 of the second prism 1504 may be approximately equal in width and length. These surfaces are coated with an anti-reflection coating, which may be anti-reflective for both visible and IR light. The third surface 1524 (defined in this view by the longer side), may be coated with a high reflectant material at near infrared (e.g., approximately 850 nanometers) with an angle of incidence (AOI) of approximately 30-60 degrees (e.g., 45 degree) and possess high transmission at the visible AOI (e.g., again at 45 degrees).

Notice that the first prism 1502 and the second prism 1504, when arranged in juxtaposition as shown in FIG. 15, together approximate a rectangle. That is, the first and second prisms 1502 and 1504 approximate right triangles in cross section, and when the longer sides are positioned adjacent to one another, the resulting combined shape approximates a rectangle. Depending upon the angles and orientations, other polygonal structures may be produced, such as trapezoids.

The third prism 1506 has a first side or surface 1530, a second side or surface 1532, and a third side or surface 1534. The third prism 1506 is smaller in size than the first and second prisms 1502 and 1504. The third prism 1506 is mated to the second prism 1504 so that there is no gap therebetween. The second and third prisms 1504 and 1506 may be joined, for example, by a ultraviolet (UV) curing cement that matches the index of the prisms, so that when it cures, the two prisms essentially function as a single, solid piece of material (e.g., glass). The third prism 1506 is used to capture the IR image and transfer it to the imaging lens and time of flight sensor.

The first and second surfaces 1530 and 1532 may be approximately equal in width and length. In one implementation, all three surfaces 1530-1534 may be implemented, for example, without any coating material. In another implementation, the second surface 1532 is coated with an anti-reflection coating. In yet another implementation, the third surface 1534 is coated with a mirror coating.

It is noted that the illustrated three-prism arrangement 1204 is merely representative. Other multi-prism arrangements with more or less than three prisms may be used. Further, the illustrated shapes and angles of the various prisms are provided to show one possible implementation, but in no way are intended to be limiting.

Figure 16:
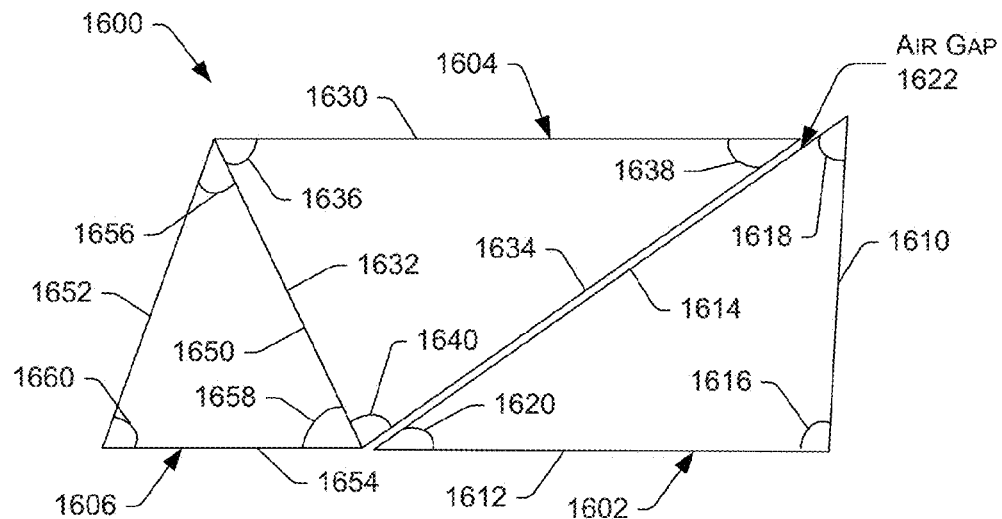
FIG. 16 shows another example implementation of a multi-prism arrangement.

FIG. 16 shows another implementation of a multi-prism arrangement 1600 that may be implemented in place of the prism arrangement 1204. The multi-prism arrangement includes a first prism 1602, a second prism 1604, and a third prism 1606. The prisms 1602-1606 may be made of any type of light transmissive material, such as glass. Each of the three prisms 1602-1606 has a three-sided triangular cross-section (as shown), and each prism defines three planar surfaces that either reflect or pass light.

The first prism 1602 has a first side or surface 1610, a second side or surface 1612, and a third side or surface 1614. These surfaces may be coated with an anti-reflection coating. The third surface 1614 (defined by the longer side) may be implemented, for example, without any coating material. The triangular cross section of the first prism 1602 is neither a right triangle nor an equilateral triangle. The triangular cross section has three interior angles 1616, 1618, and 1620. The first angle 1616 is defined between sides 1610 and 1612 and is larger than a right angle, such as approximately 94°. The second angle 1618 is defined by sides 1610 and 1614 and may be approximately 52°. The third angle 1620 is defined by sides 1612 and 1614 and may be approximately 34°.

The second prism 1604 has a first side or surface 1630, a second side or surface 1632, and a third side or surface 1634. The second prism 1604 is positioned adjacent to, but slightly spaced from, the first prism 1602. The third surface 1634 of the second prism 1604 is juxtaposed with the third surface 1614 of the first prism 1502 across an air gap 1622. The air gap 1622 separating the first and second prisms 1602 and 1604 may be very small, on the order of a fraction of a millimeter (e.g., ½ millimeter, ¼ millimeter, etc.).

The first and second surfaces 1630 and 1632 of the second prism 1604 may be coated with an anti-reflection coating, which may be anti-reflective for both visible and IR light. The third surface 1634 may be coated with a high reflectant material at near infrared (e.g., approximately 850 nanometers) with an angle of incidence (AOI) of approximately 30-60 degrees (e.g., 45 degree) and possess high transmission at the visible AOI (e.g., again at 45 degrees).

The triangular cross section of the second prism 1604 is neither a right triangle nor an equilateral triangle. The triangular cross section has three interior angles 1636, 1638, and 1640. The first angle 1636 is defined between sides 1630 and 1632 and may be approximately 65°. The second angle 1638 is defined by sides 1630 and 1634 and may be approximately 35°. The third angle 1640 is defined by sides 1632 and 1634 and may be approximately 80°.

The third prism 1606 has a first side or surface 1650, a second side or surface 1652, and a third side or surface 1654. The third prism 1606 is smaller in size than the first and second prisms 1602 and 1604. The third prism 1606 is mated to the second prism 1604 so that there is no gap therebetween. The second and third prisms 1604 and 1606 may be joined, for example, by a ultraviolet (UV) curing cement that matches the index of the prisms, so that when it cures, the two prisms essentially function as a single, solid piece of material (e.g., glass).

The triangular cross section of the third prism 1606 is neither a right triangle nor an equilateral triangle. The triangular cross section has three interior angles 1656, 1658, and 1660. The first angle 1656 is defined between sides 1650 and 1652 and may be approximately 45°. The second angle 1658 is defined by sides 1650 and 1654 and may be approximately 66°. The third angle 1660 is defined by sides 1652 and 1654 and may be approximately 69°.

Figure 17:
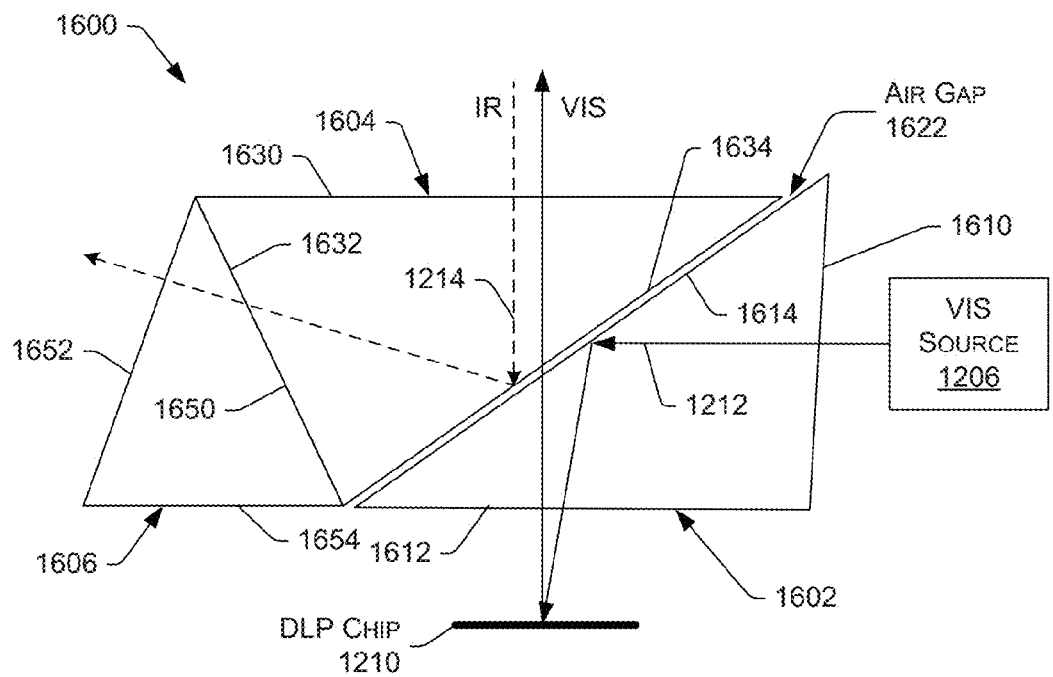
FIG. 17 shows a projected light path and IR light path through the multi-prism arrangement of FIG. 16.

FIG. 17 shows the projected light path and IR light path through the multi-prism arrangement 1600. The visible (VIS) light source 1206 generates visible light components (e.g., Red, Blue, Green components) that are passed through an integrator (not shown in FIG. 17) and into the three-prism arrangement 1600. The light source 1206 fast sequences the RGB components, and the integrator forms a more uniform rectangular beam.

The light is reflected at the third surface 1614 of the first prism 1602 onto the DLP chip 1210. When the micromirrors forming the pixels of the DLP chip 1210 are switched to a first state, the light is reflected out through the third surface 1614 of the first prism 1602, across the air gap 1622, and through the third surface 1634 and first surface 1630 of the second prism 1604. This path is represented by the solid line 1212. When the micromirrors forming the pixels of the DLP chip 1210 are switched to a second state, the visible light is reflected along a different path that prevents the light from exiting the first surface 1630 of the second prism 1604.

IR light captured by the projection system is passed through the first surface 1630 and reflected off of the third surface 1634 of the second prism 1604. The reflected IR light is passed through the third prism 1606 and out through the second surface 1652 to the lens 426, optional IR filter 438, and onto the time of flight sensor 422 (not shown in FIG. 17). The dashed line 1214 shows a representative path of the IR light.

Figure 18:
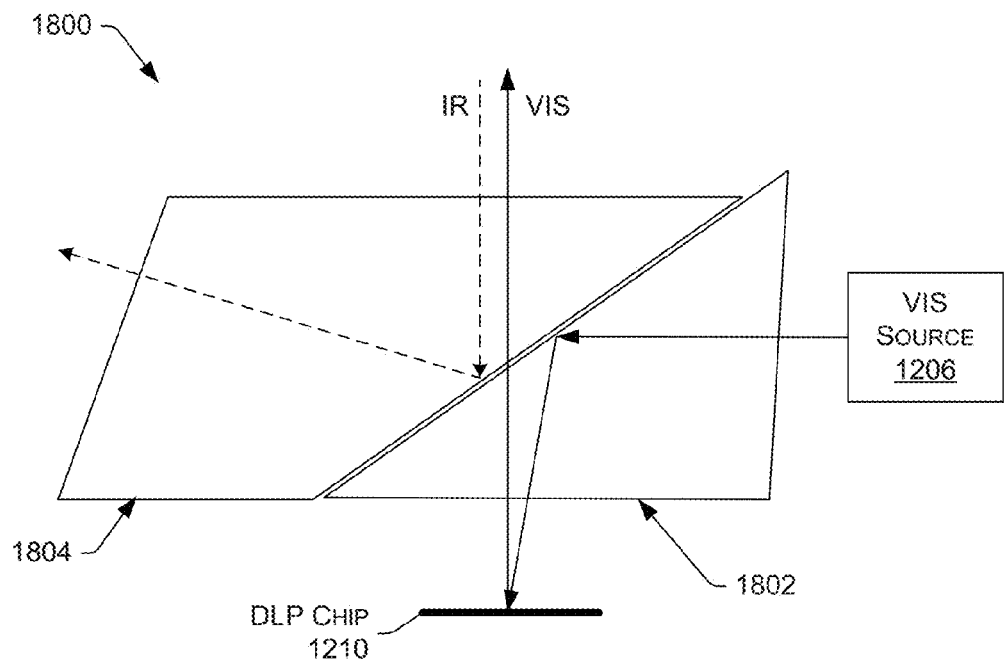
FIG. 18 shows another example multi-prism arrangement having two prisms.

FIG. 18 shows an example multi-prism arrangement 1800 having two prisms, as opposed to three. The multi-prism arrangement 1800 includes a first prism 1802 having a triangular cross section and three surfaces and a second prism 1802 with a trapezoidal cross section and four surfaces. The two-prism arrangement 1800 provides a similar optical path as shown above with respect to FIG. 17. Accordingly, the multi-prism arrangements described herein may be formed of two or more prisms to achieve an integrated optical path within in a small form factor.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
 a head structure;
 a base structure connected to the head structure by an arm mechanism;
 a plurality of components housed in one or more of the head structure or the base structure, the plurality of components comprising:
  a lens;
  a projector to project images, through the lens, onto one or more objects in an environment external to the device;
  an illumination component to illuminate, through the lens, the one or more objects in the environment into which at least a portion of the images from the projector are to be projected;
  a time-of-flight sensor to receive at least a portion of light from the illumination component scattered by the environment, the light being received at the lens, the time-of-flight sensor configured to determine a time of flight value associated with one or more objects associated with the one or more objects in the environment; and
  a processor to determine distance information of the one or more objects relative to the time of flight sensor, the distance information determined based at least in part on the determined time of flight value.

2. The device of claim 1, wherein the illumination component, the lens, the time-of-flight sensor, and the projector are arranged within the head structure.

3. The device of claim 1, wherein the illumination component, the lens, the time-of-flight sensor, and the projector are arranged within the head structure and the processor resides in the base structure.

4. The device of claim 1, wherein the illumination component comprises an infrared (IR) device to generate IR light.

5. The device of claim 1, wherein the illumination component generates an illumination field and the projector generates a projector field, the illumination field being separate from the projector field.

6. The device of claim 1, wherein the projector projects an image that covers a first area of the scene, and the illumination component illuminates a second area of the scene, wherein the second area is larger than the first area.

7. The device of claim 1, wherein the head structure is movably connected to the arm mechanism via a connector that permits rotation about two different axes.

8. The device of claim 1, wherein the head structure is movably connected to the arm mechanism via a connector that permits rotation about a pan axis and a tilt axis.

9. The device of claim 1, further comprising:
 one or more speakers arranged in the base structure; and
 a power component to provide power to at least the processor, the power component residing in the base structure.

10. The device of claim 1, further comprising one or more microphones, the one or more microphones being arranged in at least one of the base structure or the head structure.

11. A system comprising:
 a lens;
 a projector to project an image through the lens into an area external to the system;
 an illumination component, independent of the projector, to illuminate through the lens an area external to the system and into which at least a portion of the image from the projector is being projected; and
 a time-of-flight component to receive light scattered from the illuminated area and determine a time-of-flight value associated with one or more objects in the illuminated area, the light being received back through the lens.

12. The system of claim 11, wherein the lens comprises a zoom lens.

13. The system of claim 11, wherein the illumination component comprises one of an infrared (IR) device to generate IR light and a plurality of infrared (IR) light emitting diodes (LEDs) positioned adjacent the lens.

14. The system of claim 11, wherein the illumination component generates an illumination field and the projector generates a projector field, the illumination field being separate from the projector field.

15. The system of claim 11, further comprising a beam splitter to reflect the projected image from a first path onto the optical path, the beam splitter further passing the collected light along the optical path without reflection.

16. The system of claim 11, further comprising a beam splitter to pass the projected image along the optical path and to reflect the collected light from the optical path onto a first path.

17. The system of claim 11, wherein the light from the illumination component comprises infrared (IR) light, and further comprising:
 an IR filter; and
 a second lens to direct the received IR light onto the time-of-flight component through the IR filter.

18. A system comprising:
 a lens;
 a projector to project an image through the lens;
 an illumination component to generate light that is directed out through the lens to illuminate an environment external to the system and into which at least a portion of the image from the projector is being projected; and
 a time-of-flight component to receive light scattered from the illuminated area and determine a time-of-flight value associated with one or more objects in the illuminated area, the light being received through the lens.

19. The system of claim 18, wherein the lens comprises a zoom lens.

20. The system of claim 18, wherein the illumination component comprises an infrared (IR) device to generate IR light.

21. The system of claim 18, further comprising a beam splitter to reflect the projected image from a first path onto the lens, the beam splitter further passing the collected light onto the lens without reflection.

22. The system of claim 18, further comprising a beam splitter to pass the projected image onto the lens and to reflect the collected light from the lens onto a first path.

23. The system of claim 18, wherein the light from the illumination component comprises infrared (IR) light, and further comprising:
- an IR filter; and
- a second lens to direct the received IR light onto the time-of-flight component through the IR filter.

24. A system comprising:
- a lens having an associated optical path;
- a projector to project an image through the lens along at least a portion of the optical path into an environment external to the system;
- an illumination component to project light through the lens along at least a portion of the optical path in order to illuminate the environment into which at least a portion of the image from the projector is being projected; and
- a sensor to receive light scattered from the environment through the lens along at least a portion of the optical path, the sensor to use the received light for analysis of one or more objects in the environment.

25. The system of claim 24, wherein the lens comprises a zoom lens.

26. The system of claim 24, wherein the sensor comprises a time-of-flight sensor to image the received light for use in computing a time of flight value associated with the one or more objects in the environment.

27. The system of claim 24, wherein the illumination component is a laser.

28. The system of claim 24, wherein the light generated by the illumination component is the light that is scattered by the environment.

29. A method comprising:
- illuminating an environment with infrared (IR) light;
- capturing, through a lens, the IR light scattered by one or more objects in the environment;
- determining a time of flight value based on the scattered IR light that is captured through the lens; and
- projecting an image through the lens into the environment being illuminated by the IR light such that the projected image and the captured IR light pass through the lens.

30. The method of claim 29, wherein the illuminating comprises directing the IR light through the lens to illuminate the environment.

31. The method of claim 29, further comprising computing a distance to at least one object in the environment based at least in part on the time of flight value.

\* \* \* \* \*